United States Patent [19]
Stolwein

[11] Patent Number: 5,205,239
[45] Date of Patent: Apr. 27, 1993

[54] BIRD FEEDING DEVICE WITH SQUIRREL GUARD

[76] Inventor: Walter Stolwein, 5211 Roosevelt St., Bethesda, Md. 20814

[21] Appl. No.: 879,899

[22] Filed: May 8, 1992

[51] Int. Cl.$^5$ ............................................. A01K 39/01
[52] U.S. Cl. .................................. 119/52.3; 119/57.9
[58] Field of Search .................... 119/52.2, 52.3, 52.4, 119/18, 57.2, 57.8, 57.9, 61, 63

[56] References Cited

U.S. PATENT DOCUMENTS

| | | | |
|---|---|---|---|
| 1,749,808 | 3/1930 | Greene | 119/61 |
| 2,682,255 | 6/1954 | Kleeman . | |
| 2,801,611 | 8/1957 | Decker | 119/61 X |
| 3,083,687 | 4/1963 | Slaven . | |
| 3,086,499 | 4/1963 | Dilley . | |
| 3,174,459 | 3/1965 | Browne . | |
| 3,946,701 | 3/1976 | Hostetler | 119/18 |
| 4,867,104 | 9/1989 | Vandiver | 119/57.9 |

FOREIGN PATENT DOCUMENTS 2417938 10/1979 France ................... 119/61

Primary Examiner—Robert P. Swiatek
Attorney, Agent, or Firm—Birch, Stewart, Kolasch & Birch

[57] ABSTRACT

A bird feeder apparatus includes a plurality of side-by-side cylindrical containers having longitudinal slots in the top walls thereof. The slots are wide enough to permit a bird's beak to pass therethrough for access to bird seed in the containers, but the slots are too narrow to permit a squirrel's mouth to pass therethrough to reach the seed. An associated seed filling assembly is supported above the top of the cylindrical containers and includes a feedbox for seed with a slotted bottom which rests on a portion of troughs which extend from the slots in the cylindrical containers. Movement of the slidable feed plate permits the seed in the feedbox to be fed to the cylindrical containers. A weight is provided on top of the seed in the feedbox to assist the gravity feed of seed through the slotted bottom. The weight is mounted on guide posts within the feedbox for vertical, sliding movement thereon.

8 Claims, 3 Drawing Sheets

BIRD FEEDING DEVICE WITH SQUIRREL GUARD

BACKGROUND OF THE INVENTION

The present invention relates to an apparatus for feeding seed to birds including means for guarding the seed in the feeder from squirrels or the like.

In attempting to feed birds in one's yard with seed or other food, one rapidly discovers that squirrels, which are more aggressive animals, are likely to eat the seed before the birds have an opportunity. In order to preclude squirrels from beating the birds to the feed, many bird feeders have been designed with protective structures to preclude use of the feeders by squirrels while making the feeders accessible to birds. Devices of this type have taken many forms and the structures thereof have often been quite complicated making them expensive to manufacture, difficult to clean and maintain and difficult to refill for keeping a supply of seed readily available to birds.

SUMMARY OF THE INVENTION

Accordingly, it is a primary object of the present invention to provide a bird feeder for feeding seed or the like to birds including a guard for preventing squirrels from reaching the seed in the feeder.

It is another object of the present invention to provide a bird feeder which is easy to clean and refill.

It is a further object of the present invention to provide a bird feeding device in combination with a covered supply of seed attached thereto, and an associated feeding mechanism, for refilling the bird feeder with seed from the covered supply.

The objects of the present invention are fulfilled by providing an apparatus for feeding seed to birds and guarding the seed from squirrels or the like comprising a plurality of substantially cylindrical containers for seed disposed side-by-side on a baseplate, the longitudinal axis of the containers being substantially parallel; the cylindrical walls of each container being open along the top to define an upwardly facing longitudinal slot in each cylindrical container; each said longitudinal slot being wide enough to permit a bird's beak to pass therethrough to access the seed but too narrow for a squirrels mouth to pass therethrough; whereby birds can access and feed on the seed but squirrels are precluded from accessing the seed.

A system for refilling the cylindrical containers is provided and includes trough means disposed along each longitudinal slot of each cylindrical container for feeding seed into each said container.

Each of the troughs includes a pair of slanted sidewalls spaced the width of the longitudinal slots of the cylindrical containers at the bottom of the trough and flaring outwardly to a wider spacing near the top of the trough. A slidable feed plate is provided in a feedbox which rests over at least a portion of the troughs. The feedbox has slots in the bottom thereof which can be covered by the plates whereby slidable movement of the feed plates permits the flow of seed by gravity from the feedbox into the troughs to fill the cylindrical containers with seed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
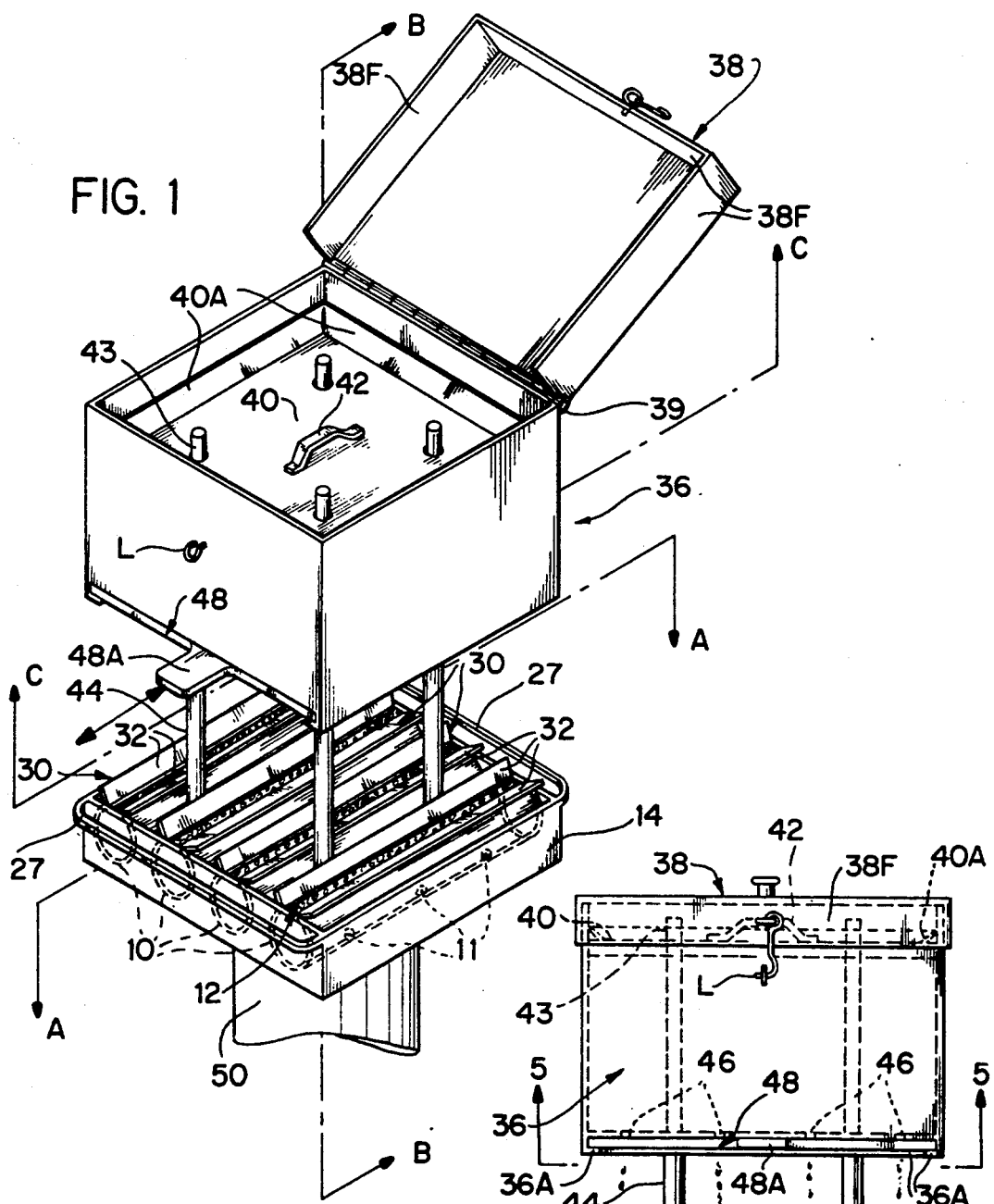
FIG. 1 is a perspective view illustrating the bird feeding apparatus of the present invention.
Figure 2:
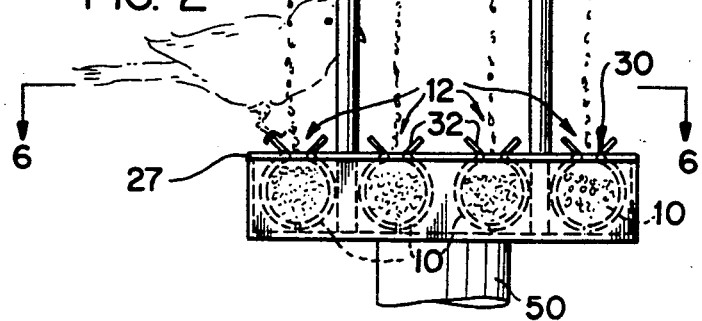
FIG. 2 is a front elevational view of the apparatus of FIG. 1.
Figure 4:
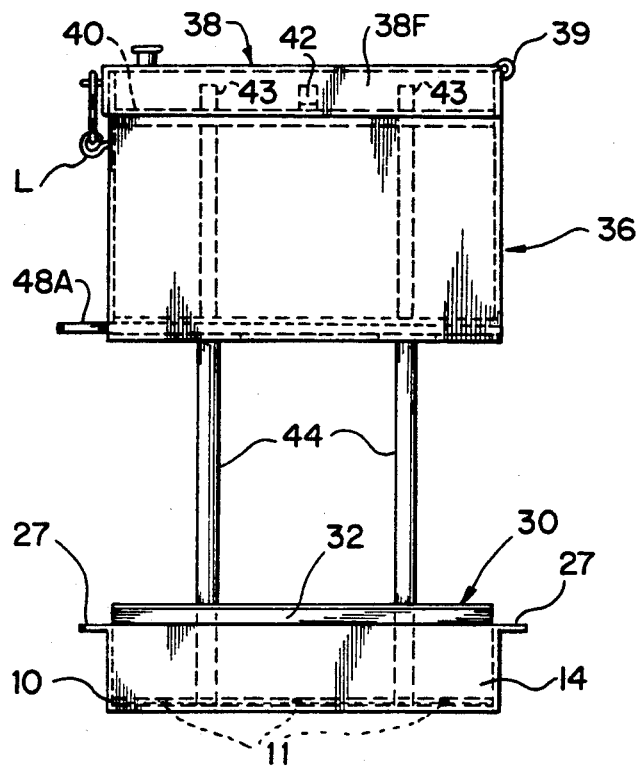
FIG. 4 is a right side elevational view of the apparatus of FIG. 1.
Figure 3:
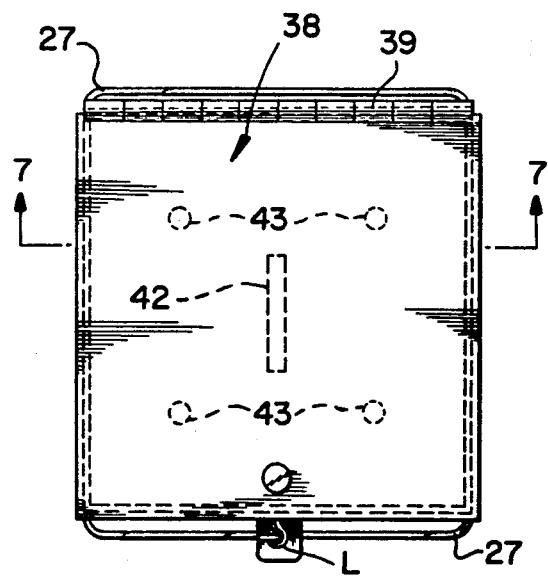
FIG. 3 is a top plan view of the bird feeder apparatus of FIG. 1.
Figure 5:
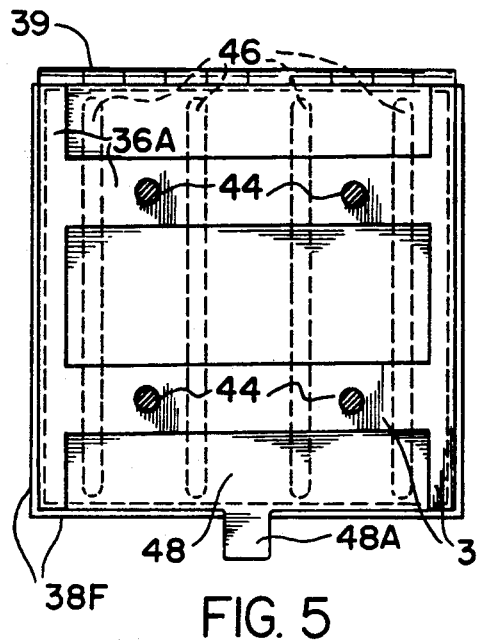
FIG. 5 is a view taken along section C—C of FIG. 1.
Figure 6:
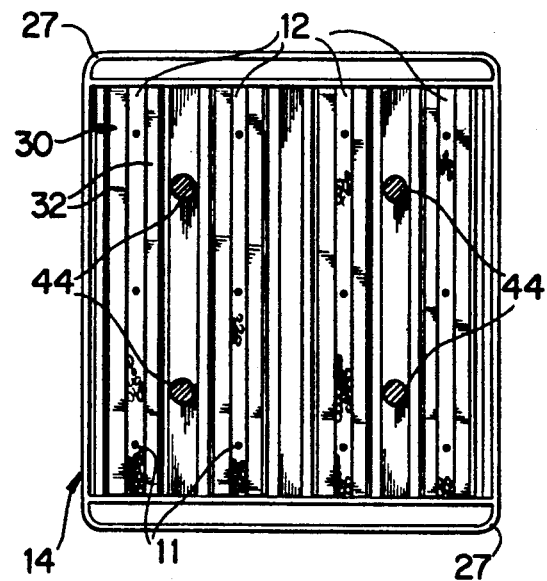
FIG. 6 is a view taken along line A—A of FIG. 1.

Referring in detail to the drawings there is illustrated a bird feeder apparatus including a plurality of cylindrical bird seed containers 10 disposed side-by-side with their longitudinal axes substantially parallel to each other. Each of the cylindrical containers 10 is open at the top to provide longitudinally extending slots 12. Each of the cylindrical containers 10 is mounted within a base tray 14 by welding or other suitable securing techniques. A plurality of troughs 30 having slanted sidewalls 32 extend along the length of slots 12 and extend above containers 10. Sidewalls 32 at the bottom thereof are spaced substantially the same distance as the width of slots 12 and cylindrical containers 10 but are flared outwardly at the top in order to receive and direct seed from a seed box 36.

It should be noted that the trough means 30 will catch any seeds that fall from the beaks of the birds and direct them back into the slots on the tops of the cylinders into which they fall. Thus they will again be available to the bird but not to the squirrels. It is further noted that the seeds which are intercepted in this manner will not fall on the ground at the base of the feeder as they do in other feeders where they create a mess and are also available to the squirrels.

The width of slots 12 in the top of cylindrical containers 10 is selected to be wide enough to provide easy access to the bird seed contained therein by the beak of a bird, but the width is too narrow to permit a squirrel's mouth or jaws to enter slots 12 to access the seed in cylindrical containers 10. Therefore, squirrels are precluded from feeding from the bird feeding apparatus of the present invention.

A series of holes 11 may be provided in the bottoms of cylindrical containers 10 for drainage.

A perch rail 27 may be provided on two sides of base tray 14 to extend transversely across the respective troughs 30 so that a bird may stand on this rail to gain easy access to the bird seed in cylindrical containers 10.

A feedbox 36 is provided and is mounted on four upstanding posts 44 which extend from the bottom of base tray 14. The distance between the bottom of feedbox 36 and base tray 14 is preferably large enough to accommodate cardinals and blue jays but not large enough to accommodate larger birds such as pigeons and doves. Feedbox 36 includes a lid 38 hinged along its entire rear edge by a piano hinge 39 to a top rear edge of feedbox 36. A suitable latch L which may simply be a hook and eye is provided for holding lid 38 down to preclude squirrels or other unwanted creatures from entering the top of the feedbox.

Figure 7:
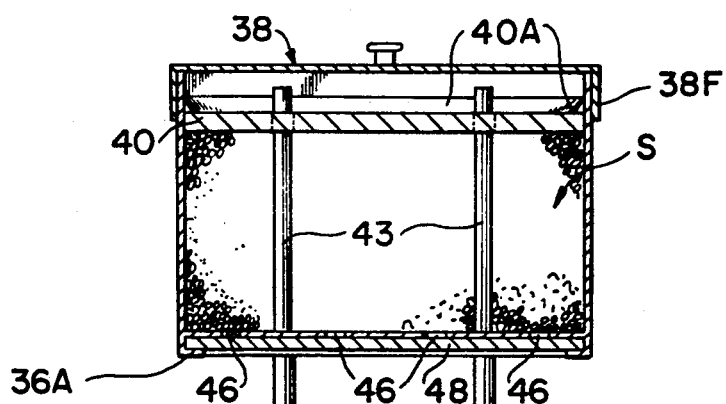
FIG. 7 is a view taken along section B—B of FIG. 1.
Figure 7:
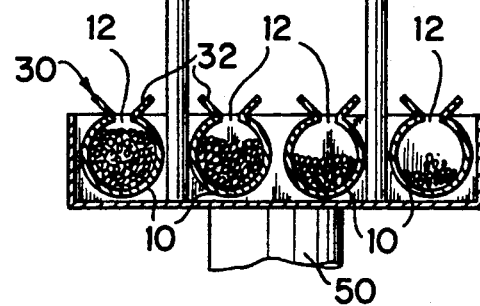

The feedbox is provided to store a supply of seed such as bird seed S therein as illustrated in FIG. 7. A weight 40 rests on top of the seed S and is mounted for sliding vertical movement up and down four guide posts 43 within the feedbox 36. One post 43 is located within each corner of feedbox 30. Weight 40 has an aperture at each corner for accommodation of guide posts 43. Weight 40 has a peripheral wiper blade 40A around all four sides to wipe the sides of the feedbox as the weight moves downwardly to ensure that all seed within box 36 is fed toward and out of the bottom through a series of slots 46. A handle 42 may be provided for lifting weight 40.

Slots 46 are aligned with slots 12 in the tops of cylindrical containers 10. A slidable plate 48 is mounted in L-shaped channels 36A in the bottom of the feedbox. A tab 48A is provided so that an operator may grasp the tab and slide the plate 48 along L-shaped channels 36A outward of the feedbox to open slots 46 and permit seed to flow under the force of gravity, and the force supplied by the weight 40, through slots 46 into troughs 30, and through slots 12 into cylindrical container 10. It should be understood that if desired, individual slide plates 48 could be provided for each of the slots 46 so that one could selectively fill one or more containers 10 aligned with associated feed slots 46 in the bottom of feedbox 36.

Lid 38 for feedbox 36 is provided with a flange 38F on three sides and in conjunction with the piano hinge 39 seals the top of feedbox 36 when the lid is closed to preclude the entry of rainwater and the like into the feedbox.

The components of the bird feeder apparatus of the present invention may be fabricated from sheet metal such as stainless steel, aluminum or the like. In the alternative the entire apparatus could be fabricated from plastic in which case the component parts could be appropriately molded, or in another alternative the entire device could be fabricated from fiberglass.

The base tray 14 could be mounted on a vertical post 50 so that the base tray 14 will have a horizontal orientation or the base tray 14 can simply be rested on another horizontal surface such as a table, railing or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An apparatus for feeding seed to birds and guarding the seed from squirrels or the like comprising:
    a plurality of substantially cylindrical containers for seed disposed side-by-side on a base plate, the longitudinal axes of the containers being parallel;
    the cylindrical walls of each container being open along the top to define an upwardly facing longitudinal slot in each cylindrical container;
    each said longitudinal slot being wide enough to permit a bird's beak to pass therethrough to access the seed but too narrow for a squirrel's mouth to pass therethrough;
    whereby birds can access and feed on the seed but squirrels are precluded from accessing the seed;
    trough means disposed above each longitudinal slot of each cylindrical container for feeding seed into each said container;
    a slidable feed plate, and a feedbox supported over at least a portion of the trough means, the feedbox having slots in the bottom aligned with said feed plate, whereby slidable movement of said feed plate permits the flow of seed by gravity from said feedbox to said trough means to fill the cylindrical containers with seed.

2. The apparatus of claim 1 wherein each trough means has slanted sidewalls spaced the width of the longitudinal slots at the trough bottom and flaring outwardly to a wider spacing near the top of the trough means.

3. The apparatus of claim 1 further comprising at least one perch rail spaced above and extending transversely of said cylindrical containers for accommodating a birds feet.

4. The apparatus of claim 1 further including a weight in the feedbox vertically slidable therein for forcing seed to flow through the slots in the bottom of the feedbox.

5. The apparatus of claim 4 wherein said weight includes apertures for accommodating guide posts extending vertically within said feedbox whereby said weight is slidable on said guide posts.

6. The apparatus of claim 5 wherein there is further provided a wiper blade extending around the perimeter of said weight for wiping the inner side walls of the feedbox as the weight moves vertically therein.

7. The apparatus of claim 5 wherein said feedbox has rectangular walls defining four corner regions and one guide post is disposed in each corner region.

8. The apparatus of claim 4 wherein there is further provided a wiper blade extending around the perimeter of said weight for wiping the inner side walls of the feedbox as the weight moves vertically therein.

* * * * *